(12) United States Patent
Schwarz et al.

(10) Patent No.: US 12,152,694 B2
(45) Date of Patent: Nov. 26, 2024

(54) VALVE

(71) Applicant: Vibracoustic SE, Darmstadt (DE)

(72) Inventors: Helge Schwarz, Toppenstedt (DE); Michael Weber, Buchholz (DE)

(73) Assignee: Vibracoustic SE, Darmstadt (DE)

( * ) Notice: Subject to any disclaimer, the term of this patent is extended or adjusted under 35 U.S.C. 154(b) by 23 days.

(21) Appl. No.: 17/541,646

(22) Filed: Dec. 3, 2021

(65) Prior Publication Data

US 2022/0178470 A1 Jun. 9, 2022

(30) Foreign Application Priority Data

Dec. 9, 2020 (DE) .......................... 102020132840.0

(51) Int. Cl.
*F16K 39/02* (2006.01)
*F16F 9/34* (2006.01)
(Continued)

(52) U.S. Cl.
CPC .............. *F16K 39/024* (2013.01); *F16F 9/34* (2013.01); *F16F 9/369* (2013.01); *F16K 15/025* (2013.01);
(Continued)

(58) Field of Classification Search
CPC ........................ F16K 39/024; B60G 17/0528
See application file for complete search history.

(56) References Cited

U.S. PATENT DOCUMENTS 2,886,377 A * 5/1959 Martin ................... B60T 15/54
303/68
5,333,645 A * 8/1994 Galazin .............. B60G 17/0525
280/124.16
(Continued)

FOREIGN PATENT DOCUMENTS

CN 111572303 A 8/2020
DE 1430557 A1 4/1969
(Continued)

OTHER PUBLICATIONS

German Office Action, 10 2020 132 840.0, dated Jul. 22, 2021 with google translation.
(Continued)

*Primary Examiner* — Kenneth Rinehart
*Assistant Examiner* — Nicole Gardner
(74) *Attorney, Agent, or Firm* — Fishman Stewart PLLC (57) ABSTRACT

A valve suitable for an air spring includes a housing body with a central longitudinal axis and channel. The housing body has a first valve opening fluidically connectable to an air spring volume, a second valve opening fluidically connectable to an air supply, which is fluidically connectable to an air spring volume, and a second valve opening which is fluidically connectable to an air supply. Each valve opening is fluidically connected or selectively connectable to the channel. A pressure limiter is provided to limit the pressure flowing out of the second valve opening, the pressure limiter including a third sealing agent and a second sealing agent associated with the second valve opening and selectively closing an opening, wherein pressurization of at least the third sealing agent displaces the second sealing agent due to the forced coupling such that it closes the corresponding opening or reduces the effective opening cross-section.

20 Claims, 6 Drawing Sheets

(51) Int. Cl.
  *F16F 9/36* (2006.01)
  *F16K 15/02* (2006.01)
  *B60G 17/052* (2006.01)

(52) U.S. Cl.
  CPC ...... *B60G 17/0528* (2013.01); *F16F 2230/30* (2013.01)

(56) References Cited

U.S. PATENT DOCUMENTS

2009/0079154 A1* 3/2009 Sheehan ............ B60G 17/0528
                                                                    280/124.16
2018/0251110 A1    9/2018 Schnittger

FOREIGN PATENT DOCUMENTS

| DE | 1930772 A1 | 1/1971 | |
|----|---|---|---|
| DE | 4234626 A1 | 4/1994 | |
| DE | 102008053994 A1 | 5/2010 | |
| DE | 102011114570 B4 | 12/2016 | |
| DE | 102015118963 A1 | 5/2017 | |
| EP | 756953 A2 * | 2/1997 | ........... B60G 17/056 |
| GB | 1260781 A | 1/1972 | |

OTHER PUBLICATIONS

Extended European Search Report, 20200873.4, dated Apr. 4, 2022.
China Search Report CN202111431704.0, dated Nov. 2, 2023 (with Eng. translation).
China Office Action, CN202111431704.0, dated Nov. 3, 2023 (with Eng. translation).

* cited by examiner

VALVE

CROSS-REFERENCE TO RELATED APPLICATIONS

This application claims priority to German Patent Application No. DE 10 2020 132 840.0, filed Dec. 9, 2020, the contents of which are hereby incorporated by reference in its entirety.

TECHNICAL FIELD

The invention is related to a valve, including a valve for an air spring, and valves suitable for use with a vehicle.

BACKGROUND

Valves for filling volume are known from practice. For example, such valves can be assigned to an air spring volume of an air spring and enable or prevent air flow into the air spring volume.

Air springs can keep a vehicle at a constant level, regardless of how heavily it is loaded. They can allow a vehicle to be lowered at high speeds to improve aerodynamics and thus range. Air springs can also optimize airflow under the vehicle for passive battery cooling in electric vehicles. They protect batteries in poor road conditions and ensure minimum ground clearance at all times. Used as suspension for commercial vehicle cabs, air springs can keep the cab at a constant level, regardless of the cab's own weight or load condition. Since the brakes on commercial vehicles are pneumatically operated, the compressors used to supply compressed air to commercial vehicles are much more powerful than those used in passenger vehicles. If the compressor intended for the brake supply is also used for the compressed air supply of the air spring, compressed air is available in sufficient quantity, but the system is characterized rather by robustness and not by low pressure fluctuations.

The use of valves in air springs is known, for example, from DE 10 2011 114 570 B4. The valves are used to admit air from an air supply into an air spring volume and to discharge air from the air spring volume into an environment.

Valves known to date, however, have the disadvantage that they or the air spring can be damaged if the inlet pressures are too high and the resulting inlet velocities are too high. The inlet pressures can fluctuate depending on the situation, especially if the compressed air is supplied via the robust compressors used to supply the brakes in commercial vehicles. The potential for damage is increasingly affecting welded plastic parts in particular, such as air spring cups or roll-off pistons or the air spring bellows. For this reason, the requirement for safe bursting pressure and protection against misuse is also increasing. If the inflow velocities are too fast, the stroke of the air spring may be too high, especially in the case of mechanically operated level controls, and the air spring may be damaged as a result.

It is therefore the task of the invention to create a valve that reliably prevents bursting of the air spring bellows, damage to welded plastic parts and an unwanted large stroke of the air spring.

SUMMARY

Various features and embodiments of the inventive concepts are disclosed herein.

An embodiment of the invention proposes, inter alia, a valve for an air spring comprising a housing body having a central longitudinal axis extending through it and comprising a channel, the housing body having a first valve opening fluidly connectable to an air spring volume, a second valve opening fluidly connectable to an air supply, each valve opening being fluidly connected or selectively connectable to the channel, pressure limiter being provided to limit the fluid pressure flowing in from the second valve opening, wherein the pressure limiter comprises a third sealing means (or sealing agent) and a second sealing means (or sealing agent) associated with the second valve opening and selectively closable to close an opening, which are positively coupled, wherein pressurization of at least the third sealing means displaces the second sealing means due to the positive coupling such that it closes the corresponding opening or reduces the effective opening cross-section.

In accordance with embodiments of the invention, the valve comprises a device, i.e., pressure limiter, for limiting or reducing pressure in order to limit or reduce an inlet pressure. The limitation may be an upper limit defining a maximum inlet pressure up to which air may flow through the valve. The valve may be capable of flow along the central longitudinal axis in one direction only, in the opposite direction only, or in both directions. The third and second sealing means may be arranged in series along the channel. It is feasible that the switching characteristic of the valve depends on the flow direction of the pressure relief medium.

It is feasible that a fluid flow is applied starting from the first valve opening to the second valve opening. Here, a spontaneous switching characteristic can be realized. If the air flow directed inwards from the valve then initially engages under or acts on the third sealing means, which is assigned to the pressure limiter, the second sealing means, which is assigned to the second valve opening, is adjusted. Spontaneously, when the limit value defined by the pressure limiter is reached, the valve closes and thus prevents the inflow of further air whose pressure is above the limit value, i.e. has an over-limit pressure. If the pressure at the valve is equal to the limit value pressure, the pressure limiter may close the valve and prevent further air from flowing into the valve. The limit pressure can be variable.

It is feasible that a fluid flow is applied starting from the second valve opening to the first valve opening. In this case, an asymptotic switching characteristic can be realized. If, on the other hand, the air flow directed in the direction of the valve first flows around the second sealing means before it engages under or acts on the third sealing means, the second sealing means closes the corresponding opening due to the forced coupling or continuously reduces the effective opening cross section so that the inflow speed of the air does not increase proportionally to the differential pressure between the air spring and the air supply or compressed air supply, but cannot exceed a limit value. Thus, the stroke speed of the air spring may be limited by the incoming air and remain within specifications that can be predefined.

The third sealing agent can be membrane-like or a diaphragm. The third sealing agent can have a surface facing the channel. It is feasible that the internal air spring pressure reaches the limit value so that a sufficiently high pressure acts on the surface of the third sealing means facing the channel to adjust or deflect the third sealing means to such an extent that the second sealing means closes the corresponding opening and thus prevents further air from flowing into the channel.

The forced coupling can be achieved, for example, by a direct and indirect connection of both sealing agents. The fluid flowing into the valve may, for example, pass through the first valve opening and/or the second valve opening. By means of the invention, a functional separation between the two sealing means can be achieved. While the second sealing agent prevents the passage of air or at least reduces an effective cross-section, the moving force that adjusts the cross-section is exerted by the third sealing agent.

The pressure limiting agent or pressure limiter may comprise the second sealing agent associated with the second valve opening to selectively open, close, or reduce the cross-section of the opening with respect to a flow of fluid directed inwardly of the valve toward the channel (or duct) so as to limit the flow of air directed into the air spring volume. The second sealing agent may be continuously adjustable between an open position and a closed position in which it is applied against a sealing surface, and may assume any position therebetween. When the second sealing agent is adjusted to its closed position, a fluid flow leading through the second valve opening is interrupted. The adjustment from the open position to the closed position may be in the direction of the inlet pressure force. This adjustment motion can be realized by means of a simple mechanism.

The housing body can be formed in one piece, but also in two or more parts, whereby at least one of the parts can be formed from a plastic. The pressure limiting agent or pressure limiter can be disposed at a distal end of the housing body in order to also protect the inner valve mechanics from limit pressure. Advantageously, the pressure limiter may be arranged at the second valve opening. A compressed air supply can be connected to the second valve opening.

Beneficially, the valve can be an inlet valve that is or can be switched into a fluid path between a compressed air supply and an air spring volume, and can limit the pressure of the incoming air. In this regard, the fluid path may extend from the first valve opening to the second valve opening through the valve, or in the reverse direction.

Optionally, the valve may have a third valve port that fluidly connects a counter pressure space within the body of the housing to an ambient or counter pressure source via a secondary channel. This allows an ambient pressure or back pressure to be introduced into the valve and supplied to the pressure limiter. Since the internal pressure in the pressure limiter on one side of a second spring can directly influence the limit pressure, the internal pressure should advantageously be as constant as possible. It is therefore advantageous if the pressure limiter comprises the counter pressure space. However, it is also possible for the counter pressure space to be formed by the housing body or the air spring and/or to be pressurized by an artificially set reference pressure or a mixture of these pressures.

In an advantageous design, the pressure limiter is actuated as a function of a pressure difference between an ambient pressure and an inlet pressure. The ambient pressure can be present at the third valve opening, the inlet pressure can be present at the second valve opening. The differential pressure or actuating pressure can be influenced by an actuator (or an actuating means), such as a force storage means. It is possible for the pressure force of the ambient pressure and the actuator to act in the same direction.

In an advantageous design, the first valve opening and the second valve opening are opposite each other with respect to the housing body. They can therefore be arranged on the end faces of the housing body, which may be cylindrical. Beneficially, the third valve opening is arranged on the circumferential surface of the housing body. This results in a small installation space requirement, in particular a small diameter, since the housing body only has to have one channel along its central longitudinal axis. A channel or secondary channel can project from this to the third valve opening at an angle, which may be at a right angle.

According to one embodiment of the valve, a first sealing agent is provided, which may be carried by a ram that is adjustable along the central longitudinal axis. It can be associated with the first valve opening to selectively open or close it. The first sealing agent can therefore open or close the channel to an air spring volume upon movement of the ram. The ram can be actuated by a control means to move it along or parallel to the central longitudinal axis. The first sealing agent prevents unwanted air entry into the air spring volume. The ram can be pre-tensioned to a closed position together with the sealing means by the force of a force storage means, such as a spring, and alternatively or additionally due to the differential pressure between the compressed air supply and the internal air spring pressure. For an embodiment with ram, the following applies: as long as the valve is open, i.e., as long as the ram is pressed into the valve and, as a result, the first sealing means (or sealing agent) no longer seals, the internal pressure of the air spring is applied to the contact surface of a third sealing means even in the closed position of the second sealing agent. This means that further air flow into the air spring is prevented as soon as an internal air spring pressure is reached that transfers the second sealing agent to the closed position. The closed position of the second sealing agent is therefore maintained independently of the inlet pressure as long as the air spring has the defined limit pressure.

In an advantageous embodiment, the pressure limiter can be arranged in the channel and/or be fluidically arranged between at least two of the valve openings. This allows the pressure limiter to be arranged in the housing body in a space-saving manner. Advantageously, the channel leads through the pressure limiter so that no bypass is formed. This allows simple sealing of the secondary channel with respect to the channel, for example by means of O-rings. Alternatively or additionally, it is possible that the secondary channel is also inserted into the pressure limiter, so that the pressure limiter has three limiting openings. The channel may extend along the central longitudinal axis in its two distal end sections and/or extend around the counter pressure space. The counter pressure space can therefore be flowed around by the air in the channel.

In a beneficial configuration, the second sealing agent can be arranged upstream of the third sealing agent or the third sealing agent can be arranged upstream of the second sealing agent. Depending on the arrangement of the sealing means and/or flow direction, different switching characteristics can be realized. In the first possibility, a spontaneous switching characteristic can be realized by abrupt closing of the second sealing agent. In the second possibility, an asymptotic switching characteristic can be realized.

In a further embodiment, the pressure-limiting means or pressure limiter can comprise a force-storing means, such as a spring, which may preload or bias the second sealing agent into its open position. The second sealing agent is therefore "normally-open". The spring can be, for example, a helical compression spring or a disc spring assembly. The effective direction of the force storage medium can be opposite to the inlet pressure direction. The force of the force storage medium can be opposed by the force resulting from the differential pressure between the inlet air pressure and the pressure in the counter pressure chamber. If the air present at the second valve opening has the limit pressure, the second sealing means is moved to its closed position or in the direction of the closed position. The pressure at the impact surface now corresponds to the limit pressure, which in turn corresponds to the internal pressure of the air spring; the limit pressure is thus the maximum permissible internal pressure of the air spring.

It is possible that an ambient pressure or back pressure is applied via the third valve opening, which is fluidically connected to the counter pressure chamber. It is also possible that any controlled pressure is present in the counter pressure chamber, which can be used to define the closing characteristic of the valve and the limit pressure. The pressure in the counter pressure chamber and the force-sensing means can act along a common line of action.

In an advantageous design, the pressure limiter can comprise the third sealing agent, which is assigned to the third valve opening in order to seal it fluid-tight with respect to the channel. The third sealing agent can be a diaphragm that can deform as a function of the differential pressure applied to its sides. The third sealing agent separates the channel in a fluid-tight manner with respect to the counter pressure chamber and/or the secondary channel. The second sealing means can allow adjustment of the pressure relief means, but at the same time prevent the fluids from the channel and the counter pressure space and/or secondary channel from mixing or pressure equalization from occurring. The second sealing agent can flexibly delimit two different pressure ranges from one another.

In an advantageous embodiment, the third sealing agent and/or a fourth sealing agent may be provided, which is associated with the second valve opening in order to selectively open or close it with respect to a fluid flow directed outwardly of the valve. This can enable a residual pressure holding function should the inlet air pressure be lower than the air spring internal pressure and the first sealing means be transferred to an open position. The third sealing agent and/or the fourth sealing agent prevent fluid flow from the valve or the channel (or duct) via the second valve opening. By integrating a residual pressure holding function, a defined amount of fluid can remain in the air chamber volume at all times, so that a certain residual pressure is always maintained in the air chamber volume. This prevents the air spring bellows from being compressed or pulled apart without pressure, thus protecting the air spring bellows from damage. The integrated unit of inlet valve, pressure holding function and residual pressure holding valve creates a simple and cost-effective valve that, on the one hand, maintains the function of the inlet valve for level control and, on the other hand, protects the air spring from damage by ensuring a predefined residual pressure in the air spring while at the same time protecting it from an overpressure limit. The third sealing agent and/or the fourth sealing agent can be pretensioned by means of a force storage means, such as a spring, into the outward closing position of the valve.

In a beneficial design, the third sealing agent or the fourth sealing agent can be in contact with a sealing surface in the closed position closing the second valve opening outwardly of the valve. The sealing surface can, for example, be formed by a spacer element, such as a sealing collar. The spacer element may distance the third sealing agent or the fourth sealing agent from a surface against which the third sealing agent or the fourth sealing agent would otherwise rest. Alternatively or additionally, the third or fourth sealing means (or sealing agent) may have at least one sealing edge that comes into contact with the sealing surface in the closed position. As a result, the third sealing agent or the fourth sealing agent can form a pressure-applying surface on which pressurized air can act to move the third sealing agent or the fourth sealing agent out of contact with the sealing surface and into the open position. The third sealing agent or the fourth sealing agent can be subjected to the pressurized air.

In an advantageous embodiment, the pressure limiter can comprise an actuator which can support the second sealing agent and/or the third sealing agent and/or the fourth sealing agent and/or can be preloaded by the force storage means of the pressure limiter. The actuator may be adjustably mounted along the central longitudinal axis. The actuating element may be floatingly supported, for example, by the pressure limiter. The sealing means can be made of the same material as the actuator and/or can be connected thereto. The actuator can be an injection-molded part, which may comprise plastic, and can be formed in a cost-effective manner. By means of the actuator, an adjusting movement can be transmitted simultaneously to several sealing agents. A force-coupled movement takes place. This also allows functional integration in the actuator and a reduction in the number of components. The actuator can have a contact section for the force storage means, such as an actuator base, which may be bounded on the circumference by a cylinder section. This hollow cylinder section can then form a receptacle for the force storage means or the spring. A mandrel section may project therefrom along the central longitudinal axis, which may support and/or form one or more sealing means. The mandrel section can realize the forced coupling function. The actuator then has a longitudinal tuning fork shape.

It is possible that the first and/or the second and/or the third and/or the fourth sealing agent of the valve are elastomer bodies, thermoplastic elastomer bodies and/or plastic bodies. Such materials have good sealing properties and are easy to process. Elastomer seals, for example, can be vulcanized on and plastic bodies or thermoplastic elastomer bodies can be sprayed on. However, sealants can also be manufactured separately.

The invention also relates to the use of a valve according to the invention as an inlet valve or combination valve, such as an inlet valve or combination valve of an air spring, including an air spring of a vehicle, which may be a road vehicle. A combination valve can be an inlet valve that can also release pressures that are too high in the opposite direction. For example, it can release excessively high internal pressures from an air spring volume.

BRIEF DESCRIPTION OF THE DRAWINGS

Further features, details and advantages of the invention are apparent from the wording of the claims and from the following description of embodiments based on the drawings.

Showing.

DETAILED DESCRIPTION

In the figures, identical or corresponding elements are designated with the same reference signs and are therefore not described again unless appropriate. Features already described are not described again to avoid repetition and are applicable to all elements with the same or corresponding reference signs, unless explicitly excluded. The disclosures contained in the entire description are applicable mutatis mutandis to identical parts with identical reference signs or identical component designations. Also, the positional indications selected in the description, such as top, bottom, side, etc., are related to the directly described as well as depicted figure and are to be transferred mutatis mutandis to the new position in the event of a change of position. Furthermore, individual features or combinations of features from the different embodiment examples shown and described can also represent independent, inventive solutions or solutions according to the invention.

Figure 1:
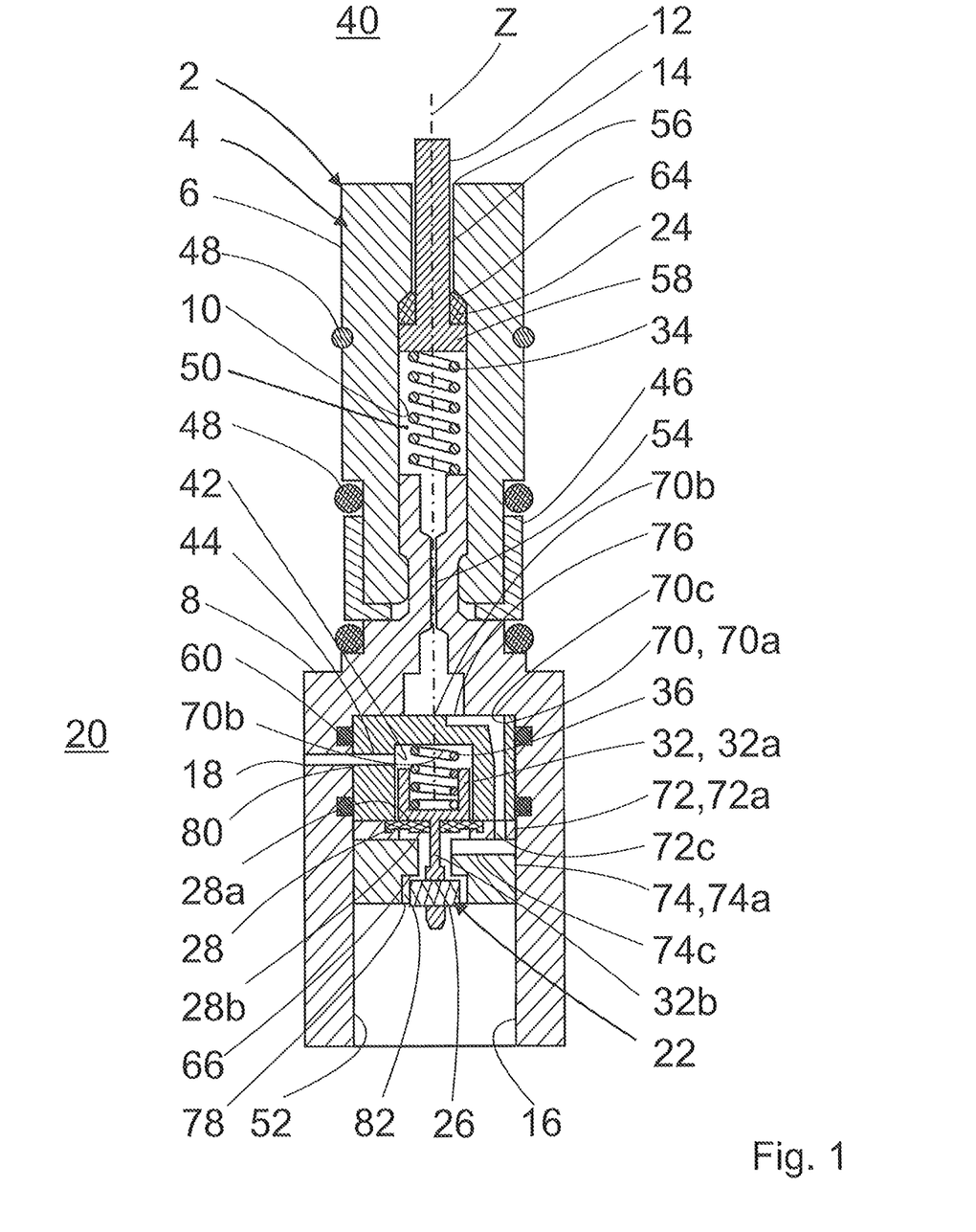
FIG. 1 illustrates a longitudinal sectional view through a valve according to the invention according to a first embodiment.

FIG. 1 shows a valve 2 in a preferred design as a spring valve, with the springs acting in the direction of a central longitudinal axis Z passing centrally through the valve 2. The opening and closing pressure can be adjusted in a simple and reliable manner via the spring forces as a function of the differential pressure.

The valve 2 in FIG. 1 extends along the central longitudinal axis Z. The valve 2 comprises a housing body 4, which encloses a first housing part 6 and a second housing part 8. The housing parts 6, 8 are each of bushing-like design and can be made of a plastic. The second housing part 8 engages in the first housing part 6, although the engagement can also basically be reversed if the housing parts 6, 8 are adapted accordingly. On the outer circumference, the housing parts 6, 8 are fixed to one another by means of a clamping ring 46. On the outer circumference, the housing body 4 carries various sealings 48 in recesses or recesses, which are designed as O-rings in this case.

Each housing part 6, 8 has a receiving chamber 50, 52 extending along the central longitudinal axis Z. On the end face, the first housing part 6 has a first valve opening 14. The first valve opening 14 can be fluidically connectable to an air spring volume 40. Likewise, the second housing part 8 has or comprises a second valve opening 16 on the end face, via which an air supply can be connected. In the illustrated inlet valve, air is introduced into the valve 2 via the second valve opening 16 in order to guide it into the air spring volume 40. In addition, the second housing part 8 forms a passage channel 54 for fluidic connection of the two receiving chambers 50, 52. The two valve openings 14, 16 are fluidically connected to each other via a channel 10, the channel 10 extending through the valve 2.

Channel 10 is bounded on the circumference in one section by the wall of the first housing part 6. A ram 12 is guided in the receiving space 50 of the first housing part 6 and thus in the channel 10, which ram projects into the receiving space 50 with its shaft 56 via the first valve opening 14. A head 58 of the ram 12 is guided in the receiving space 50, which is pressed into the channel 10 to open the valve 2 towards the air spring volume 40. The ram 12 carries a first sealing means 24, which is formed as an elastomer body and is associated with the first valve opening 14 to selectively open or close the same. For this purpose ram 12 is guided in a displaceable fashion along the central longitudinal axis Z. The closed position of the first sealing agent 24 is shown, in which it rests fluid-tightly against a sealing surface 64 in order to prevent further air entry into the air spring volume 40. The sealing surface 64 of the first housing member 6 also forms a first sealing. In the open position, ram 12 is adjusted downward in the image plane and the first sealing agent 24 is lifted off the sealing surface 64. Fluid can then pass through the head 58 via channels not shown.

A first spring 34 is also arranged in the receiving space 50 as a force storage means. The spring 34 is of the helical compression spring type. The spring 34 is supported at one end on the second housing part 8 and at the other end on the head 58 of the ram 12. Ram 12 is preloaded together with the first sealing agent 24 by means of the first spring 34 into the closed position.

A second sealing agent 26 is disposed in the receiving space 52, which is formed as an elastomeric body and is associated with the second valve opening 16 to selectively open or close the same. Shown is the open position of the second sealing agent 26, in which it is spaced from a second sealing surface 66 to allow fluid flow into the channel 10. The sealing surface 66 of a third cylindrical element 74 also forms a second sealing seat. In the closed position, the second sealing agent 26 is displaced upwardly in the image plane to engage the sealing surface 66. To reduce installation space, the second sealing agent 26 is arranged in a sealing agent recess 82 of the third cylinder element 74.

A pressure limiter 22 is arranged in the receiving space 52, through which the channel 10 also leads. The pressure limiter 22 serves to limit a fluid pressure acting from the second valve opening 16 into the channel 10. In the illustrated embodiment, the pressure limiter 22 comprises three mutually abutting cylinder elements 70, 72, 74, which may be pressed into the receiving space 52. The multiple parts serve to simplify the manufacture of the pressure limiter 22 and the assembly in the receiving space 52. The three cylinder elements 70, 72, 74 can each be a metal or plastic part. The first cylinder element 70 is of cup-shaped design and, in addition to a circumferential cylinder wall 70a, has a cylinder base 70b extending at right angles thereto. The second and third cylinder elements 72, 74 are each annular in shape and each comprise only a respective cylinder wall 72a, 74a, with fluid thus being able to flow through them in the direction of the central longitudinal axis Z.

The counter pressure chamber 42 in the first cylinder element 70 as well as the secondary channel 44 are sealed with respect to the channel 10 in the second housing part 8 via two seals 60 arranged in recesses, which are designed as O-rings. The counter pressure chamber 42 is connected to an environment 20 of the valve 2 via a secondary channel 44, which extends through the cylinder wall 70a and the wall of the second housing part 8. Ambient pressure prevails in the environment 20. For this purpose, the valve 2 has a third valve opening 18 on its outer circumference, which can be formed as a bore or groove, which may extend circumferentially. The counter pressure chamber 42 is fluidically sealed off from the channel 10 by means of a third sealing means 28, which is designed as an elastomer diaphragm. The pressure present in the environment 20 therefore prevails in the counter pressure chamber 42.

The third sealing agent 28 is received circumferentially in an annular groove of the second cylinder body 72 and is pressed by the latter in a sealing manner against the first cylinder body 70. The third sealing agent 28 therefore has a first acting surface 28a, which faces the counter pressure chamber 42, the pressure conditions there and the spring force of a spring 36 acting directly or at least indirectly on the acting surface 28a. The third sealing agent 28 further comprises a second acting surface 28b facing the channel 10, the pressure conditions there acting directly or at least indirectly on the acting surface 28b. The deformation of the third sealing agent 28 is thus directly dependent on the pressure conditions in the counter pressure chamber 42 and the channel 10.

The pressure limiter 22 comprises an actuator 32, which is displaceable along the central longitudinal axis Z. The actuator 32 is guided in a floating manner by the first cylinder element 70. For this purpose, it is floatingly guided by the first cylinder element 70. The actuator 32 has a hollow cylinder section 32 a, which serves to guide it and is arranged in the counter-pressure space 42. Projecting therefrom at right angles and along the central longitudinal axis Z, the actuator 32 also comprises a mandrel section 32 b which passes through the third sealing means 28. The actuator 32 therefore has a longitudinal tuning fork shape. The mandrel section 22 b carries the second sealing agent 26 and the third sealing agent 28, which may be vulcanized or molded thereon.

The second spring 36 is arranged in the counter pressure chamber 42 as a force storage means. The spring 36 is of the helical compression spring type. The spring 36 is supported at one end by the actuator 32 and at the other end by the cylinder base 70b. The actuator 32 is thus biased with the second sealing agent 26 and the third sealing agent 28 by means of the second spring 36 to the open position of the second sealing agent 26. The hollow cylinder section 32a forms a receptacle for the second spring 36.

The pressure limiter 22 includes a first limiting opening 76, which fluidically connects the pressure limiter 22 to the first valve opening 14 via the channel 10. The pressure limiter 22 includes a second limiting opening 78, which fluidically connects the pressure limiter 22 to the second valve opening 16 via the channel 10. In addition, the pressure limiter 22 includes a third limiting opening 80 which fluidically connects the pressure limiter 22 to the third valve opening 18 via the secondary channel 44. The pressure limiter 22 therefore also comprises three openings.

Channel 10 extends through the pressure limiter 22 between the first limiting opening 76 and the second limiting opening 78. For this purpose, the first cylinder element 70 comprises a channel section 70c, the second cylinder element 72 comprises a channel section 72c and the third cylinder element 74 comprises a channel section 74c, wherein the channel sections 70c, 72c, 74c are fluidically connected to the respective adjacent channel section 70c, 72c, 74c. The channel sections 70c, 72c, 74c may be formed as boreholes. The channel sections 70c, 72c, 74c may be introduced or formed before the pressure limiter 22 is arranged in the receiving space 52. It is therefore apparent that the channel 10 connecting the valve openings 14 and 16 extends around the back pressure chamber 42. The course of the channel 10 therefore deviates from the central longitudinal axis Z in the region of the counter pressure space 42. The counter pressure space 42 thus has air flowing around it in the channel (or duct) 10. As a result, the counter pressure chamber 42, the second sealing means 26 and the third sealing means 28 are brought under inlet pressure frontally into the air flowing in along the central longitudinal axis Z and are therefore exposed to the inlet pressure frontally.

The ambient pressure in the back pressure chamber 42 and the second spring 36 act on the third sealing agent 28 along a common line of action along the central longitudinal axis Z. The third sealing agent 28 can be moved in the opposite direction. An inlet pressure force may act in the opposite direction, optionally from an air supply through the second valve opening 16. The force of the second spring 36 and the force created by the ambient pressure on the inlet surface 28a add up to a force directed downward in the image plane. The second sealing agent 26 is only moved into its closed position in contact against the sealing surface 66 when the counter force resulting from the inlet pressure flowing in via the second valve opening 16 onto the effective surface 28b, which is directed upwards in the image plane, exceeds the downwardly directed total force of ambient pressure and spring force. A limit pressure is then applied. The adjustment therefore takes place as a function of a pressure difference between, on the one hand, an ambient pressure and a spring force and, on the other hand, an inlet pressure. However, before the limit pressure is reached, the second sealing agent 26 can be continuously adjusted in the direction of the sealing surface 66 as a function of the pressure conditions.

To fill the air spring volume 40, a control means not shown can move the ram 12 downward in the image plane to lift it off its sealing seat on the sealing surface 64. This clears a fluid path through the channel 10 into the air spring volume 40. Closing of the valve 2 is accomplished by the control means no longer acting on the piston and the positioning force of the first spring 34 moving the ram 12 upward in the image plane to the closed position.

In order to avoid repetition, only the differences from FIG. 1 are explained in the following figure descriptions.

Figure 2A:
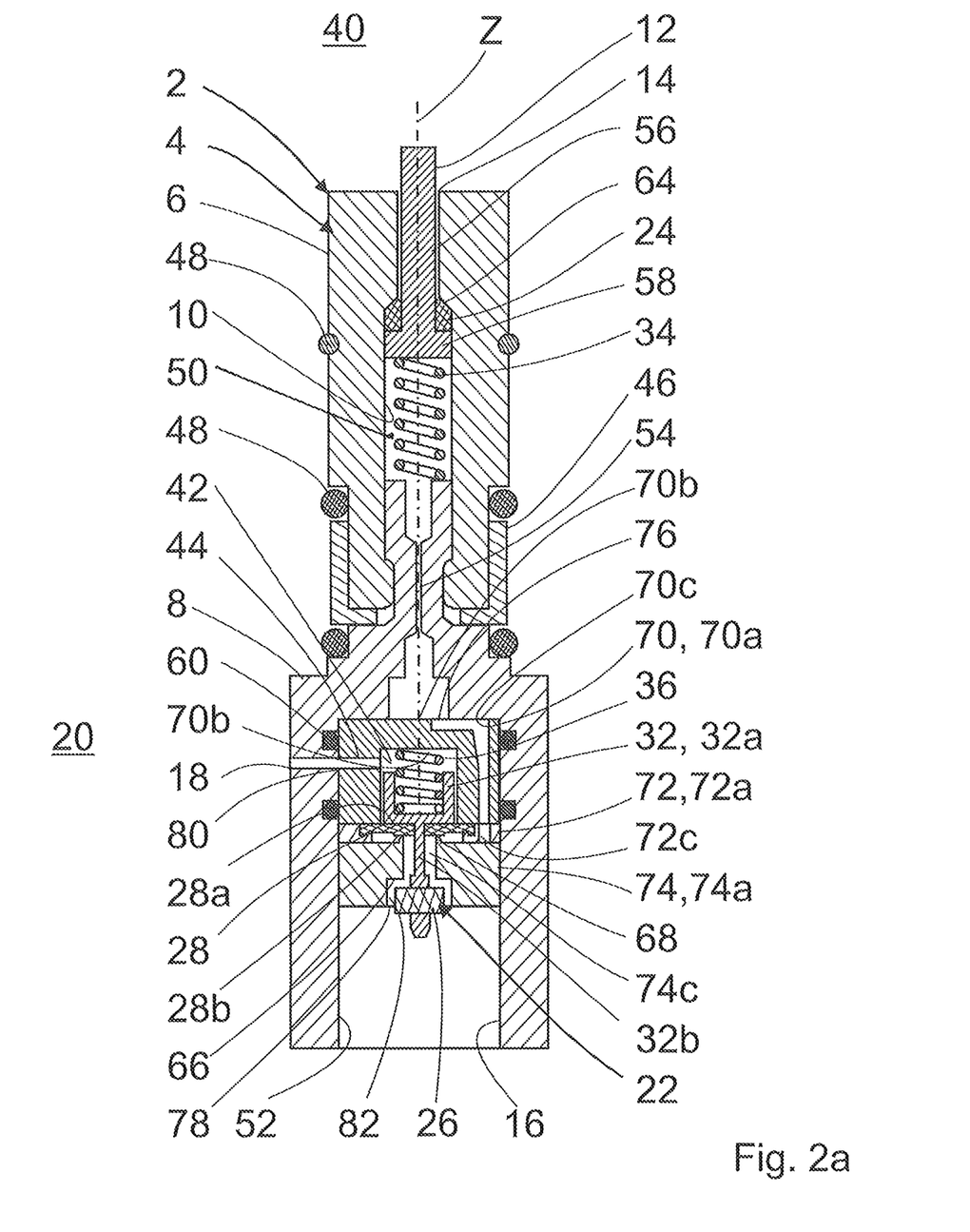
FIG. 2a illustrates a longitudinal sectional view through a valve according to the invention according to a second embodiment in a first position.
Figure 2B:
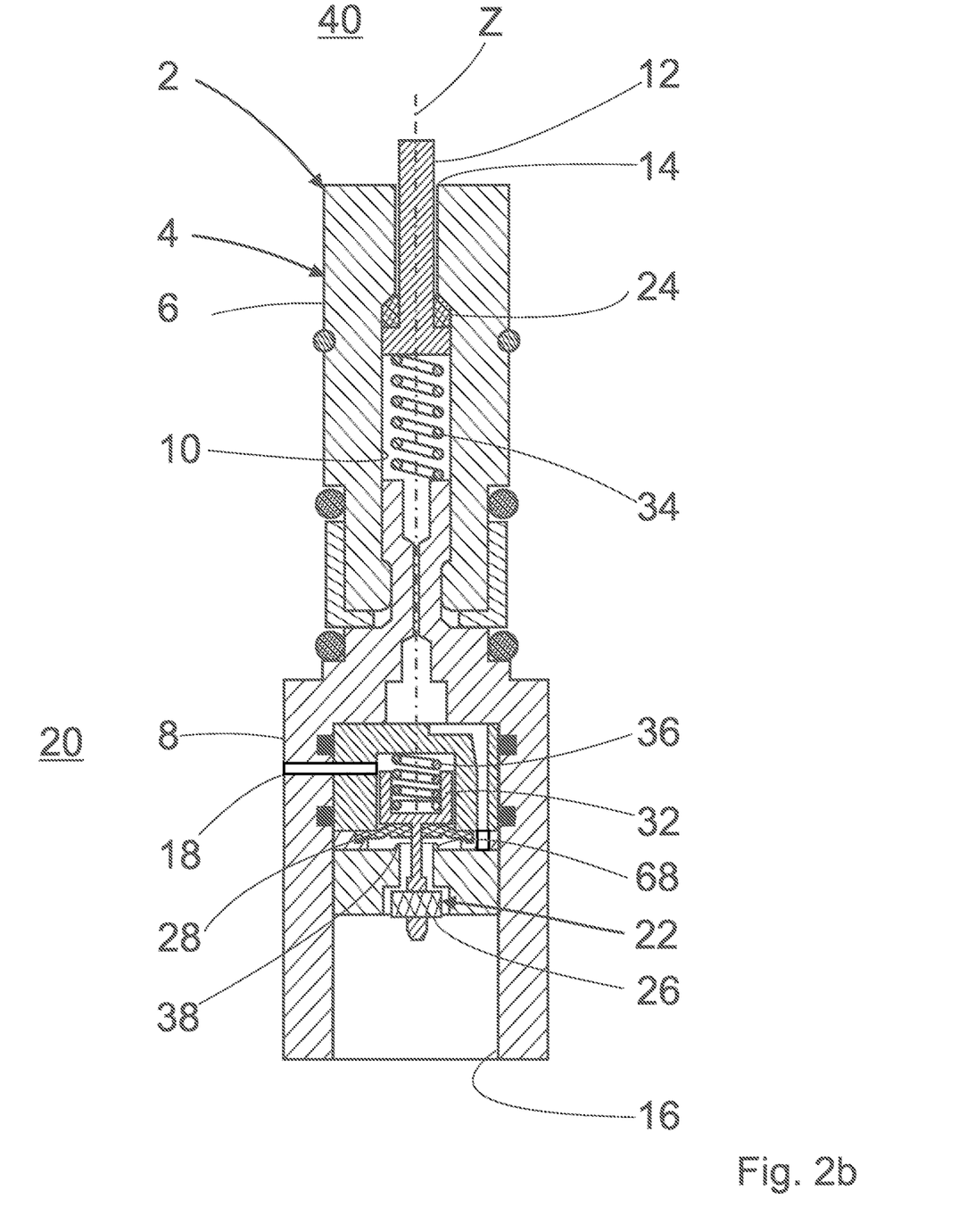
FIG. 2b illustrates a longitudinal sectional view through a valve according to the invention according to a second embodiment in a second position.

FIGS. 2a and 2b show the valve 2 already illustrated in FIG. 1, but this is supplemented by a residual pressure holding function. For this purpose, the third cylinder element 74 has an annular collar 38 which surrounds a section of the channel section 74c. The second spring 36 tensions the third sealing agent 28 against the annular collar 38. There, in its "normally-closed" state, it abuts a third sealing surface 68 formed by the annular collar 38. This contact basically closes channel 10.

However, air from the air supply flowing in through the second valve opening 16 can move the third sealing agent 28 upward in the image plane against the spring force of the second spring 36 and ambient pressure, lifting it off the sealing seat at the sealing surface 68, as shown in FIG. 2b. This allows air to flow into the air spring volume 40 when ram 12 is in the appropriate position.

It can be seen that the third sealant 18 may fulfill a dual function. It may serve a pressure-limiting function and at the same time a residual pressure retaining function.

Figure 3:
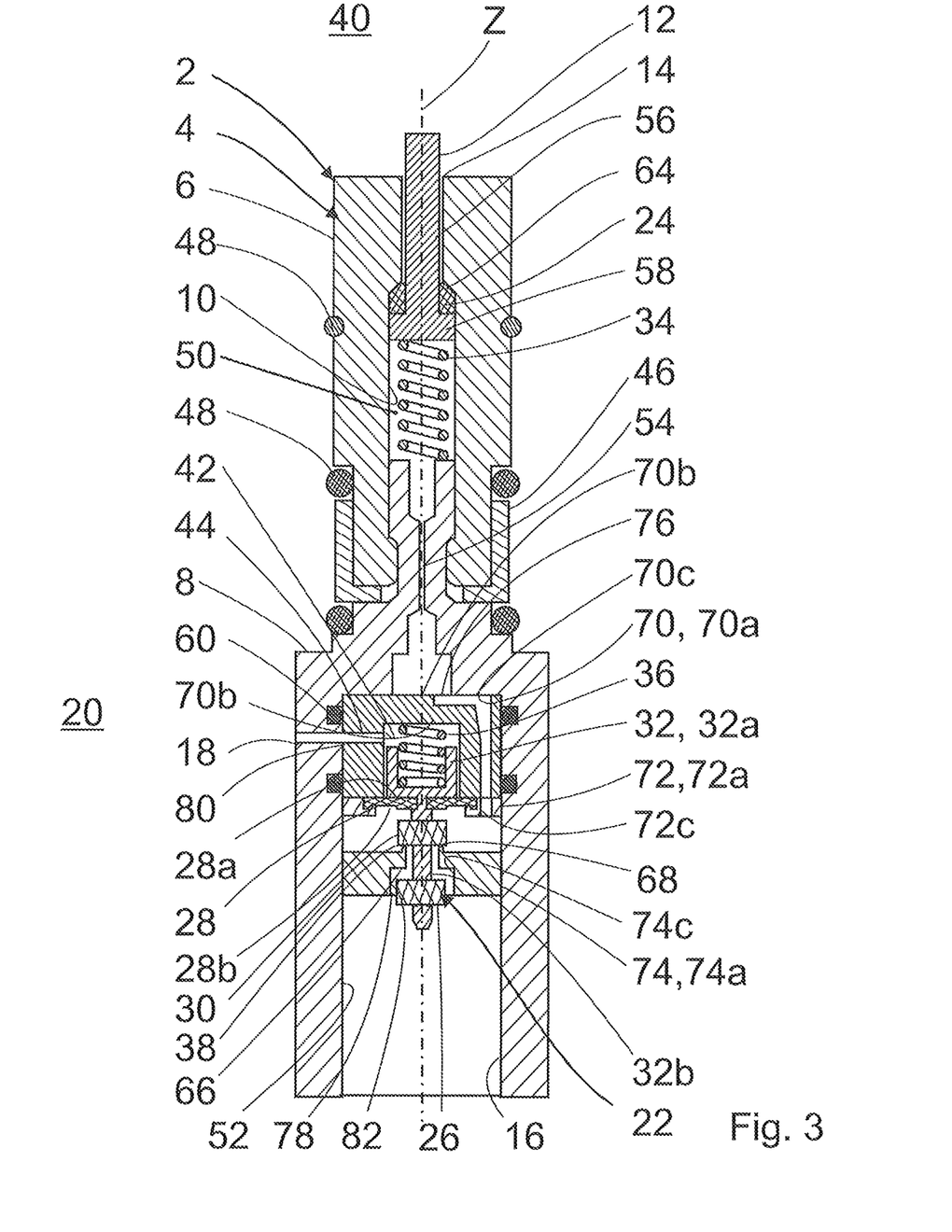
FIG. 3 illustrates a longitudinal sectional view through a valve according to the invention according to a fourth embodiment.

FIG. 3 shows a valve 2 such as illustrated in FIG. 1, but this is also supplemented by a residual pressure holding function, whereby a separation of tasks takes place here. The third sealing agent 28 continues to close the counter pressure chamber 42, as already explained above, and serves the pressure-limiting function. Now, however, a fourth sealing agent 30 is additionally provided, which is designed as an elastomer body and is assigned to the second valve opening 16 in order to selectively open or close it. The fourth sealing agent 30 is also supported by the mandrel section 32b.

The second spring 36 also biases the fourth sealing agent 30 against the annular collar 38. There, in its "normally-closed" state, it rests against the third sealing surface 68 formed by the annular collar 38. Due to this abutment, the channel 10 is generally sealed. The fourth sealing agent 30 serves the residual pressure retaining function. Air flowing in via the second valve opening 16 lifts the fourth sealing agent 30 off its sealing surface 68.

Figure 4:
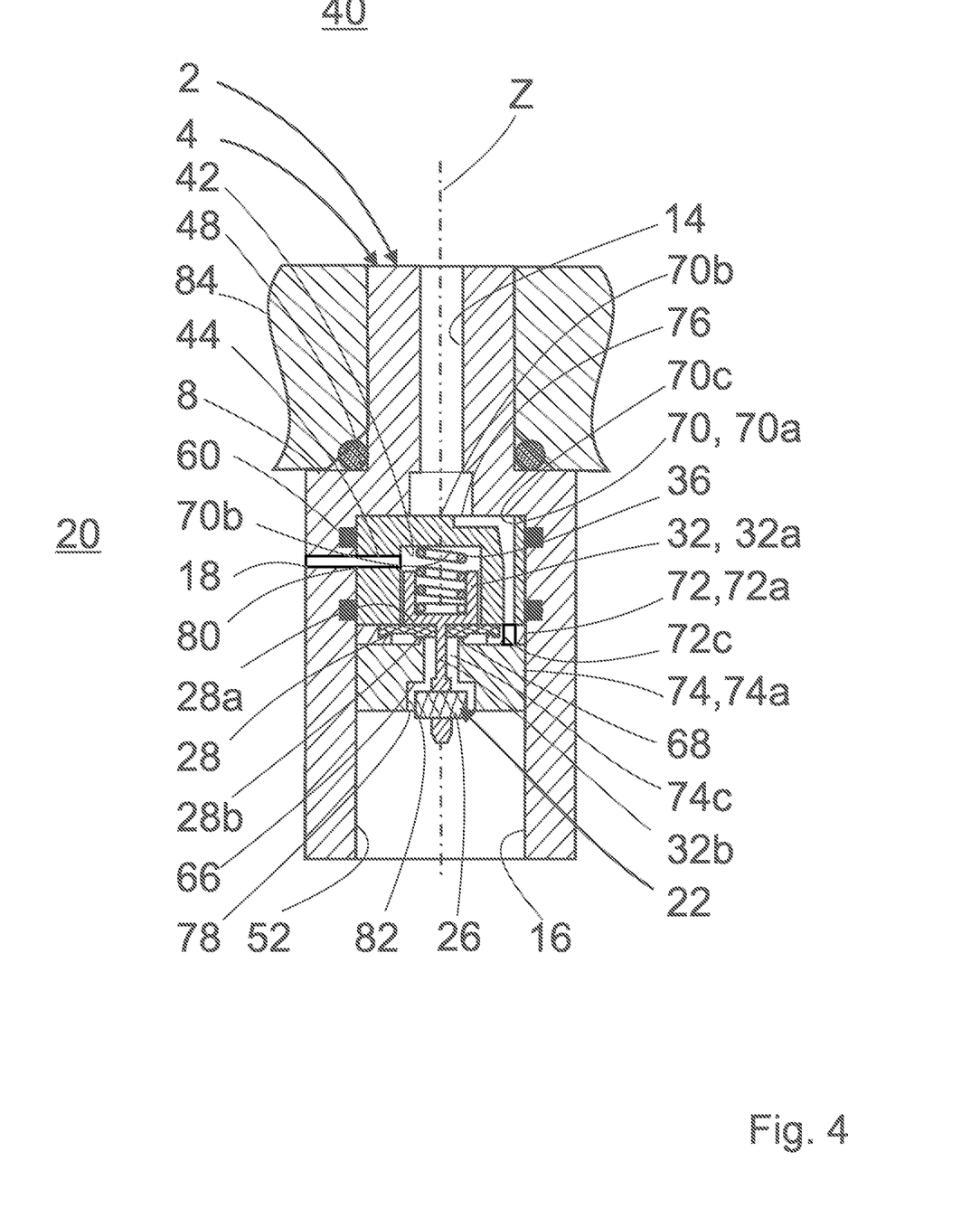
FIG. 4 illustrates a longitudinal sectional view through a valve according to the invention according to a fifth embodiment.

FIG. 4 shows a further embodiment of valve 2, wherein the housing body 4 is now shown in one piece and comprises only a housing part 8 with a receiving space 52. In addition, the valve 2 does not have a ram 12 and a first sealing agent 24. Rather, the valve 2 or the second sealing agent 26 always opens automatically as long as the inlet pressure at the valve opening 16 is greater than the internal air spring pressure at the valve opening 14 and the internal air spring pressure does not yet exceed its limit value. A component 84, such as an air spring cup, can be arranged at the first valve opening 14 and can be sealed from an environment by means of a seal 48.

Figure 5:
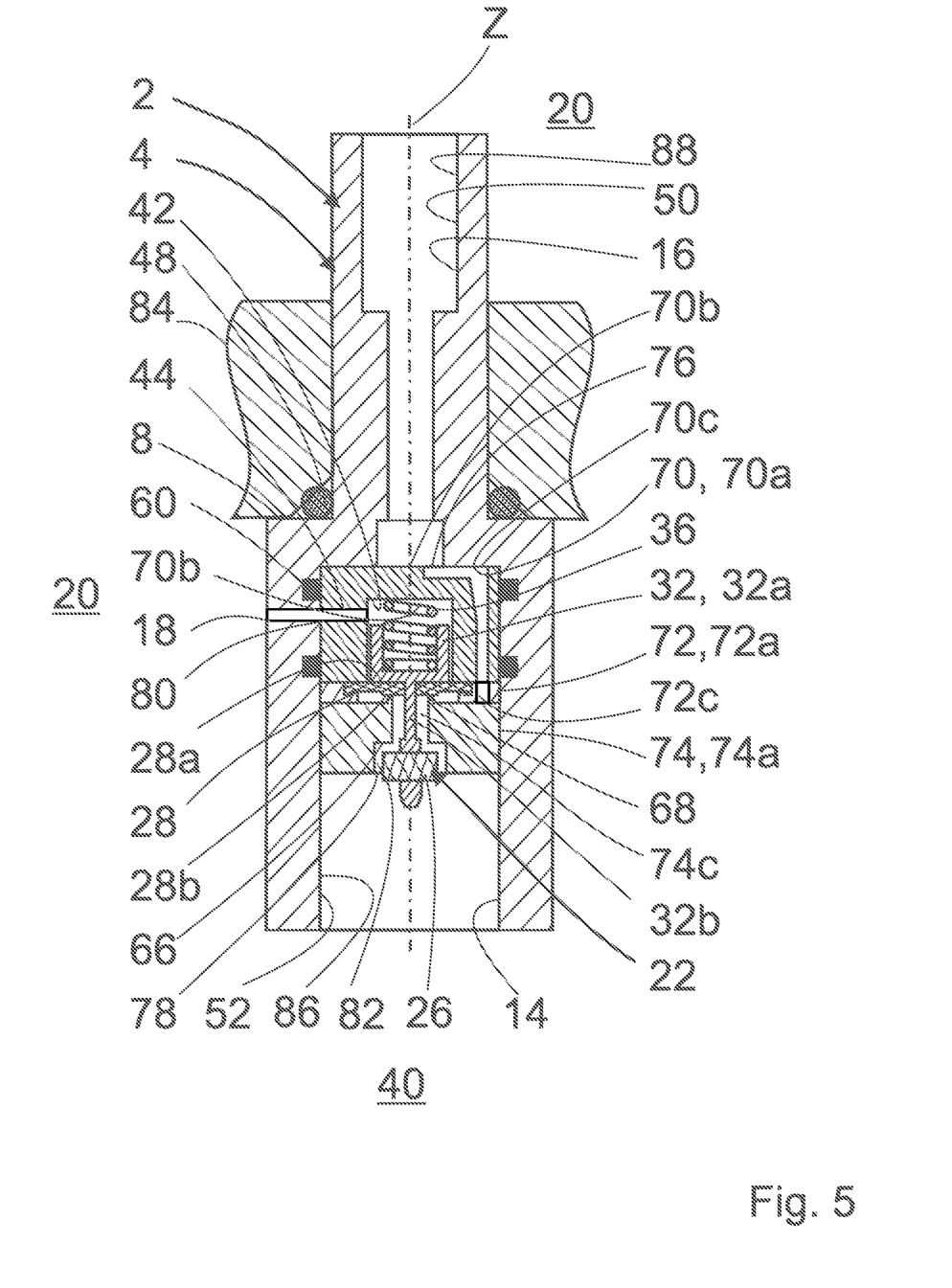
FIG. 5 illustrates a longitudinal sectional view through a valve according to the invention according to a sixth embodiment.

FIG. 5 shows another embodiment of the valve 2, wherein the housing member 8 now includes a passage channel 54 connecting a larger diameter section 86 of the receiving chamber 52 to another larger diameter section 88 of the receiving chamber 52. Section 86 may be connected or connectable to an air spring volume 40 via the first valve opening 14, and section 88 may be connected or connectable to an air supply via the second valve opening 16. Section 88 of the receiving space 52 may be configured to receive an air supply. Further, the second sealing agent 26 is associated with the first valve opening 14 or air spring volume 40 disposed in the image plane below. The air flowing into the air spring volume 40 through the channel 10 via the valve opening 14 initially engages under the third sealing means 28, acts on the acting surface 28b and thus causes the third sealing surface 68 to no longer block the air flow. Rather, the actuator 32 moves upward in the image level against the spring force and against the pressure prevailing in the counter pressure space 42, thus releasing the channel section 74c. Via the third valve opening 18 and the secondary channel 44, the back pressure, which can define the limit pressure, is applied to the surface 28a of the third sealing agent 28 opposite the impact surface 28b. Only after flowing through the channel section 74c does the air spring volume-inwardly directed air flow flow around the second sealing element 26. Due to the fact that the pressure of the air spring volume-inwardly directed air flow directly acts on the inlet surface 28b before flowing around the second sealing element 26, an inlet pressure which is greater than the limit pressure leads directly and very directly to a closing of the channel section 74c by the pressure limiter 22 or the second sealing agent 26. This is achieved by the fact that the forced coupling between the sealing agents 26, 28 leads to the second sealing agent also moving in the direction of its closed position when the adjusting means 32 is adjusted.

The invention is not limited to one of the above-described embodiments, but can be modified in a variety of ways. All features and advantages resulting from the claims, the description and the drawing, including constructional details, spatial arrangements and process steps, can be essential to the invention both individually and in the most varied combinations.

Within the scope of the invention are all combinations of at least two of the features disclosed in the description, claims and/or figures.

To avoid repetition, features disclosed according to the apparatus should also be considered disclosed according to the process and be claimable. Likewise, features disclosed according to the process shall be considered as disclosed according to the device and shall be claimable.

What is claimed:

1. A valve for an air spring, comprising:
a housing body including a central longitudinal axis, a channel, a first valve opening fluidically connectable to an air spring volume, a second valve opening fluidically connectable to an air supply, the first valve opening and the second valve opening each being fluidically connected or selectively connectable to the channel; and
a pressure limiter comprising a mandrel section;
wherein the pressure limiter includes a third sealing agent and a second sealing agent associated with the second valve opening, the pressure limiter selectively closes an opening and limits fluid pressure flowing through the second valve opening; one or any combination of the following: the mandrel section passes through the third sealing agent, the mandrel section supports the third sealing agent, or the mandrel section forms the third sealing agent; the mandrel section carries the second sealing agent, the mandrel section forms the second sealing agent, or the mandrel section carries and forms the second sealing agent; the mandrel section provides a rigid, non-flexing forced coupling between the second sealing agent and the third sealing agent; and pressurization of at least the third sealing agent displaces the second sealing agent to close the corresponding opening or reduce the opening cross-section.

2. The valve according to claim 1, wherein the valve comprises a third valve opening that fluidically connects a counter pressure space within the housing body to an environment or a counter pressure source via a secondary channel.

3. The valve according to claim 2, wherein the third sealing agent is associated with the third valve opening and closes the third valve opening in a fluid-tight manner with respect to the channel.

4. The valve according to claim 1, wherein a first sealing agent is provided, the first sealing agent is carried by a ram adjustable along the central longitudinal axis and is associated with the first valve opening for selectively opening or closing the first valve opening.

5. The valve according to claim 1, wherein the pressure limiter is arranged in the channel and/or is fluidically arranged between at least two of the valve openings.

6. The valve according to claim 1, wherein the second sealing agent is disposed upstream of the third sealing agent.

7. The valve according to claim 1, wherein the third sealing agent is disposed upstream of the second sealing agent.

8. The valve according to claim 1, wherein the pressure limiter comprises a spring.

9. The valve according to claim 1, wherein the pressure limiter comprises a force storing means that tensions or biases the second sealing agent into its open position.

10. The valve according to claim 1, wherein the third sealing agent and/or a fourth sealing agent are associated with the second valve opening to selectively open or close the second valve opening with respect to a fluid flow directed outwardly of the valve.

11. The valve according to claim 1, wherein the pressure limiter comprises an actuator carrying one or more of the second sealing agent, the third sealing agent, and a fourth sealing agent.

12. The valve according to claim 11, wherein the pressure limiter is biased by a spring or force storing means.

13. The valve according to claim 1, wherein the mandrel section carries the second sealing agent and the third sealing agent, and the third sealing agent is vulcanized or molded on the mandrel section.

14. The valve according to claim 1, wherein the pressure limiter comprises an actuator having a portion that, in longitudinal cross section, is U-shaped.

15. The valve according to claim 1, wherein the second sealing agent and the third sealing agent comprise an elastomer, a thermoplastic elastomer, and/or a plastic.

16. An air spring, including a valve in accordance with claim 1.

17. The air spring according to claim 16, wherein the valve is an inlet valve.

18. The air spring according to claim 16, wherein the valve is a combination valve.

19. The air spring according to claim 16, wherein the air spring is an air spring of a vehicle.

20. The air spring according to claim 19, wherein the vehicle is a road vehicle.

\* \* \* \* \*